United States Patent
Matthews et al.

(10) Patent No.: US 6,439,738 B1
(45) Date of Patent: Aug. 27, 2002

(54) BATTERY POWERED PORTABLE ELECTRIC LIGHT SOURCE SYSTEMS

(75) Inventors: John Wallace Matthews, Newport Beach; Paul Youngcho Kim, Westminster; Luc Pierre Benoit, La Cañada Flintridge, all of CA (US)

(73) Assignee: Surefire, LLC, Fountain Valley, CA (US)

( * ) Notice: Subject to any disclaimer, the term of this patent is extended or adjusted under 35 U.S.C. 154(b) by 120 days.

(21) Appl. No.: 09/618,346

(22) Filed: Aug. 2, 2000

(51) Int. Cl.⁷ .................................................. F21L 4/00
(52) U.S. Cl. ..................... 362/194; 362/184; 362/208
(58) Field of Search ................................. 362/157, 194, 362/195, 208, 184

(56) References Cited

U.S. PATENT DOCUMENTS

| | | | | |
|---|---|---|---|---|
| 2,513,071 A | * | 6/1950 | Wendt | |
| 4,607,207 A | * | 8/1986 | Bruneau | 362/194 X |
| 5,188,450 A | * | 2/1993 | Anderson | 362/194 |
| 5,642,932 A | | 7/1997 | Matthews | 362/206 |

FOREIGN PATENT DOCUMENTS

CH            310355    * 10/1955 ................. 362/194

* cited by examiner

*Primary Examiner*—Stephen Husar

(57) ABSTRACT

A battery powered portable electric light source has multiple sets of spare batteries contained in its battery compartment, whereby mixups between exhausted and fresh batteries are effectively avoided. A flashlight having a light output stronger than the mentioned electric light source is provided for use of batteries from the battery compartment of the mentioned portable container, and batteries are exchanged between that portable container and that flashlight. Apparatus for providing electric light have an electric light source requiring for energization a pair of batteries in series and a portable container for several pairs of these batteries connected each in series at a bottom of that container. Each of these several pairs of batteries includes a first battery having a first positive terminal and an opposite first negative terminal, and a second battery having a second positive terminal connected to that first negative terminal and an opposite second negative terminal. First positive terminals of first batteries of the several pairs of batteries and second negative terminals of second batteries of the several pairs of batteries are in substantially the same plane for selective application of the electric light source thereto for energization therefrom. A socket for the electric light source includes terminals corresponding to adjacent terminals of any one of the several pairs of batteries in that container. Unspent batteries in film packs may be used to energize light sources.

44 Claims, 7 Drawing Sheets

BATTERY POWERED PORTABLE ELECTRIC LIGHT SOURCE SYSTEMS

FIELD OF INVENTION

The subject invention relates to battery powered portable electric light source systems.

BACKGROUND

Flashlights exist in a very large number of different kinds, but seem to have in common the basic feature that such portable light sources carry within their battery compartment essentially only the batteries that are used jointly for energizing the flashlight. In those prior-art cases, backup batteries had to be procured from outside the flashlight's battery compartment whenever the flashlight's batteries inside the flashlight's battery compartment had become exhausted or too weak for a given task. Often, the needed replacement batteries were not at hand when the need therefor arose.

A prudent practice therefore was to carry separate replacement batteries when intending to use a flashlight regularly or for a longer period of time. However, even then, when exhausted batteries were taken out of the flashlight's battery compartment for replacement by fresh batteries from outside the compartment, there often was confusion, particularly outdoors in the dark, between exhausted and fresh batteries, whereby continued use of the flashlight was delayed until the confusion had been cleared up, often with the aid of another flashlight, if such was available.

Moreover, the confusion between exhausted and fresh batteries tended to infuse itself into the flashlight's battery compartment by causing the user to mistakenly reinsert a substantially exhausted battery into the flashlight's battery compartment along with a fresh battery. The result was a lower light output from the erroneously paired old and new batteries. Sometimes, if the old batteries were not too exhausted, such lower light output still was strong enough to raise uncertainty whether the user was in fact using fresh batteries of low quality or whether the user rather had been confused enough to erroneously mix old and fresh batteries. Unfortunately, when an old battery was reinserted in the flashlight's battery compartment instead of one of the fresh backup batteries at hand, then such left-out fresh battery was accidentally thrown away in the mistaken belief that it was one of the old batteries that had been removed from the flashlight's battery compartment.

In the photographic art, photographic film packs are well known which include their own internal battery, such as for energization of a film advance motor, a photoflash, an exposure meter system, focusing apparatus and/or a camera-to-object indicating device. Typically, the battery still has power when all photographic film has been used up from the film pack. Disposal of such empty film packs with unspent internal batteries may pose an environmental problem, especially since the number of film packs so disposed continuously is huge over large areas of the United States and other regions of the world. From an environmental point of view, it would be better if the batteries in the film packs were spent so that all electrolyte would be substantially neutralized in each internal film pack battery.

Additionally or alternatively, it would be useful to extend the utility of such photographic film packs beyond the supply of film from the pack.

SUMMARY OF INVENTION

The system and apparatus of the subject invention avoid such drawbacks and provides battery powered portable electric light sources wherein multiple sets of spare batteries are readily contained in the battery compartment of the portable electric light source and wherein mixups between exhausted and fresh batteries are effectively avoided.

The invention resides in a method of providing electric light, comprising, in combination, selecting an electric light source requiring for energization a pair of batteries in series, making a portable container for several pairs of these batteries, effecting a first energization of the electric light source from a first pair of the several pairs of batteries while located in that container, thereafter effecting a second energization of the electric light source from a second pair of the several pairs of batteries while located in that container, and thereafter effecting a third energization of the electric light source from a third pair of the several pairs of batteries while located in that container.

The invention also resides in a method of providing electric light, comprising, in combination, selecting first and second electric light sources each requiring for energization a pair of batteries in series, making a portable container for several pairs of these batteries, effecting a first energization of the first electric light source from a first pair of the several pairs of batteries while located in that container, thereafter effecting a second energization of the first electric light source from a second pair of the several pairs of batteries while located in that container, thereafter effecting a third energization of the first electric light source from a third pair of the several pairs of batteries while located in that container, effecting an energization of the second electric light source from a pair of the several pairs of batteries while located in that container, and thereafter effecting a further energization of the second electric light source from another pair of the several pairs of batteries while located in that container.

The invention resides also in a method of providing electric light with an electric light source, comprising, in combination, making a portable container for at least half a dozen batteries, effecting a first energization of that electric light source from one of these batteries while located in that container, thereafter effecting a second energization of the electric light source from a second one of these batteries while located in that container, and thereafter effecting a third energization of the electric light source from a third one of these batteries while located in that container, providing a flashlight having a light output stronger than the above mentioned electric light source and being separate from the container for use of batteries from that container, and exchanging batteries between that container and that flashlight.

The invention resides also in apparatus for providing electric light, comprising, in combination, an electric light source requiring for energization a pair of batteries in series, a portable container for several pairs of these batteries, and means for alternatively effecting a first energization of that electric light source from a first pair of the several pairs of batteries while located in that container, a second energization of the electric light source from a second pair of the several pairs of batteries while located in that container, and a third energization of the electric light source from a third pair of the several pairs of batteries while located in that container.

From another aspect thereof, the invention resides in apparatus for providing electric light, comprising, in combination, an electric light source requiring for energization a pair of batteries in series, a portable container for several pairs of these batteries connected each in series at a bottom of that container, each of these several pairs of batteries including a first battery having a first positive terminal and an opposite first negative terminal, and a second battery having a second positive terminal connected to that first negative terminal and an opposite second negative terminal, with first positive terminals of first batteries of the several pairs of batteries and second negative terminals of second batteries of the several pairs of batteries being in substantially the same plane for selective application of the electric light source thereto for energization therefrom, and a socket for the electric light source including terminals corresponding to adjacent terminals of any one of the several pairs of batteries in that container.

From another aspect thereof, the invention resides in apparatus for providing electric light, comprising, in combination, an electric light source requiring batteries for energization, a portable container for several of such batteries, an electric light source mount and applicator including a lid on that container selectively applying the electric light source to such batteries when closed, and an electric light source OFF switching arrangement including a catch between the lid and the container releasably retaining that lid in a partially open position so as to disconnect the electric light source from the batteries. A second catch between the lid and the container may releasably retain that lid closed until released to its partially open position.

From another aspect thereof, the invention resides in a method of using an unspent battery having a pair of output terminals in a photographic film pack, comprising, in combination, providing a container for receiving such photographic film pack, providing at that container an electric light source for energization by the unspent battery, inserting the photographic film pack into the container, alternating the photographic film pack in the container between a first position in which the battery is disconnected from the electric light source and a second position, and connecting the electric light source to the pair of output terminals in that second position of the photographic film pack in the container.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which.

MODES OF CARRYING OUT INVENTION

The drawings illustrate methods and apparatus 10 for providing electric light 11 or 211 according to the subject invention and embodiments thereof.

Figure 5:
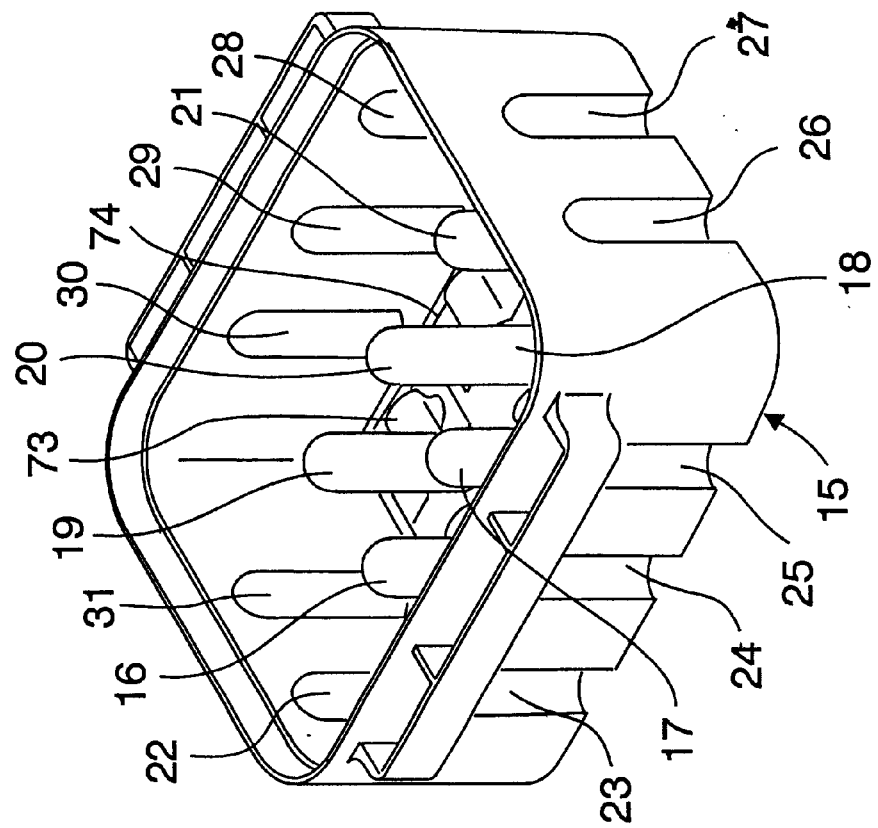
FIG. 5 is a perspective view of a container used in the apparatus of FIGS. 1, 2, 4, 6, 7 and 8.

In this respect, a preferred embodiment of the invention selects an electric light source 12 requiring for energization a pair of batteries 13 and .14 in series and provides a portable container 15 for several pairs of such batteries. In order to show details of the inside of the container, no batteries have been shown as such in FIG. 5. However, there in fact is a battery in each of the twelve compartments 16, 17, 18, 19, 20, 21, 22, 23, 24, 25, 26 and 27 in the illustrated container 15, for a total of a dozen batteries or six pairs of batteries in such illustrated container. There ideally is a battery in each of the twelve compartments 16, 17, 18, 19, 20, 21, 22, 23, 24, 25, 26 and 27, even though only one pair, such as the batteries 13 and 14, of those twelve batteries may be used at one time for energization of the light source 12.

By way of example, three-volt lithium batteries, such as of the well-known type DL123A, may be used in the container 15. While lithium batteries are preferred for their long life, alkaline or other batteries may be used in the practice of the subject invention.

According to an embodiment of the invention, a first energization of the electric light source 12 is effected from a first pair (series-connected batteries 13 and 14) of the six or other several pairs of batteries while located in the container 15. Thereafter a second energization of that electric light source 12 is effected from a second pair of the several pairs of batteries while located in the container 15, such as from two series-connected batteries located in compartments 16 and 17.

Subsequently, a third energization of the electric light source 12 is effected from a third pair of the several pairs of batteries while located in the container 15, such as from two series-connected batteries located in compartments 20 and 21, for example, and so forth. In this manner, all six pairs of the twelve batteries in the container 15 may be used in sequence to energize the electric light source 12.

As apparent in the further course of this disclosure, embodiments of the invention provide means for alternatively effecting a first energization of the electric light source 12 from a first pair of said several pairs of said batteries while located in the container 15, a second energization of the electric light source 12 from a second pair of the several pairs of batteries while located in the container 15, and a third energization of the electric light source 12 from a third pair of the several pairs of batteries while located in the container 15 and so forth, such as in the manner described in the preceding paragraphs hereof.

Figure 2:
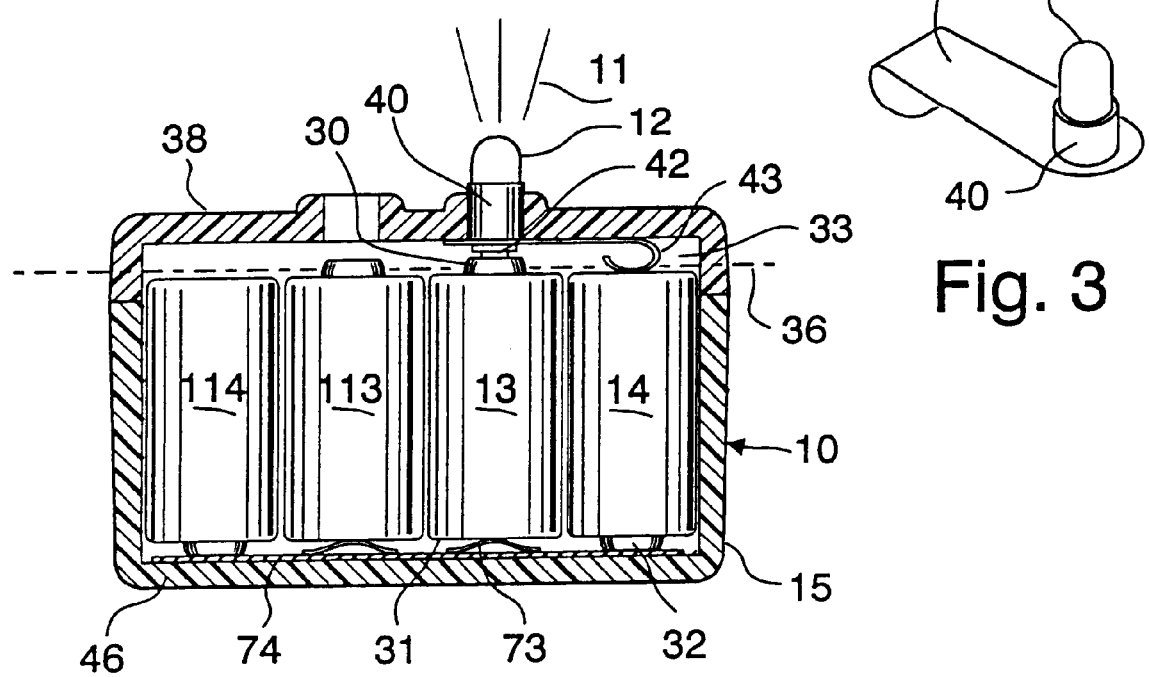
FIG. 2 is a section taken on the line 2—2 in FIG. 1.
Figure 4:
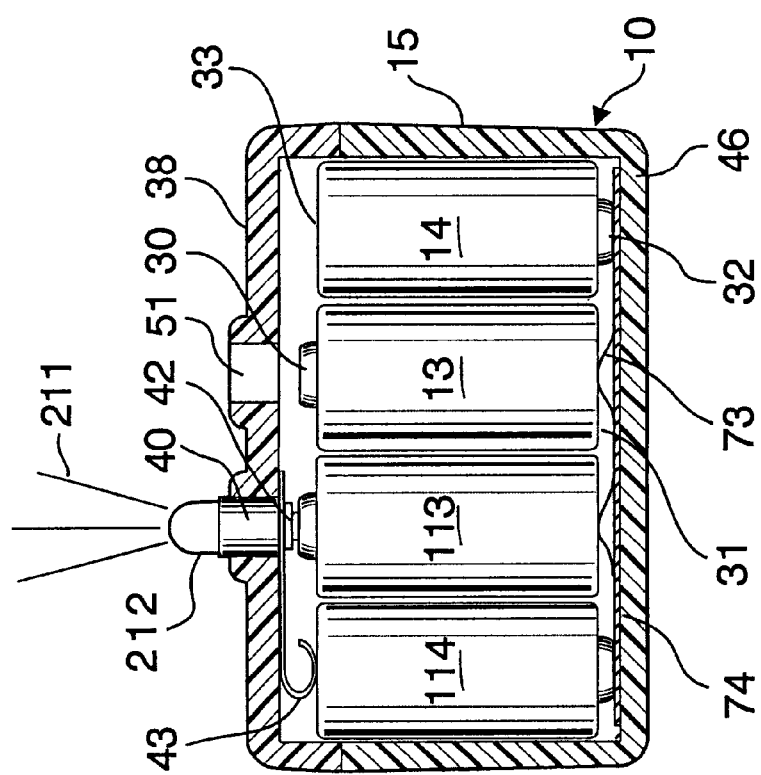
FIG. 4 is a view similar to FIG. 2, but showing the lamp assembly in a different position.

According to a preferred embodiment of the invention, each of the several pairs of batteries includes a first battery, such as the battery 13, having a first positive terminal 30 and an opposite first negative terminal 31, and a second battery, such as the battery 14, having a second positive terminal 32 connected to that first negative terminal 31 and an opposite second negative terminal 33, such as illustrated in FIGS. 2 and 4, but applicable to each of the six pairs of twelve batteries in the container 15. However, in order to avoid overcrowding of the drawings, these further illustrated terminals of such further first and second batteries of such further pairs of batteries, have not explicitly been shown in the drawings.

In this respect, first positive terminals 30, etc., of first batteries 13, etc., of the several pairs of batteries, and second negative terminals 33, etc., of second batteries 14, etc., of those several pairs of batteries are positioned in substantially the same plane 35 for selective application of the electric light source 12 thereto for energization therefrom.

The first energization of the electric light source 12 includes an application of that electric light source to the first pair (series-connected batteries 13 and 14) of the several pairs of batteries in the container 15.

The second energization of the electric light source 12 includes an application of that electric light source to the second pair, such as to two series-connected batteries located in compartments 16 and 17, of the several pairs of batteries in the container 15. The third energization of the electric light source 12 includes an application of that electric light source to the third pair, such as to two series-connected batteries located in compartments 20 and 21, of the several pairs of batteries in the container 15, and so forth through fourth, fifth and sixth energizations, such as from the remaining pairs of batteries in compartments 22, 23, 24, 25, 26 and 27, for example.

Within the scope of the invention, means may be provided for alternatively applying the electric light source 12 to the first pair (series-connected batteries 13 and 14) of the several pairs of batteries in the container 15, to the second pair, such as to two series-connected batteries located in compartments 16 and 17, of the several pairs of batteries in the container 15, and to the third pair, such as to two series-connected batteries located in compartments 20 and 21, of the several pairs of batteries in the container 15, and so forth through the remaining pairs, preferably one at a time for the same electric light source 12.

An embodiment of the invention provides a lid 38 for the container 15 and effects application of the electric light source 12 to any pair of the several pairs of batteries 13 and 14, etc., in that container with that lid, such as shown in FIGS. 2 and 4 of the drawings.

The illustrated embodiment of the invention provides a socket 40 for the electric light source 12 including electric terminals for that light source. One of these terminals may be the outer sleeve of that socket. The other of these terminals preferably is in the center at the bottom of that socket, such as shown at 42 in FIGS. 2, 4, 6, 7 and 8, such as for engagement with the first positive terminal 30 of the first battery 13 seen in FIG. 2.

Socket 40 thus may be suitable for application to any pair of the several pairs of batteries in the container 15 for energization of that light source. One of the terminals of the light source socket 40 may be supplemented by an extension, such as by the clip 43 seen in FIGS. 2, 3, 4, 6 and 7 inside and attached to the lid 38. Such extension or clip 43 may be attached to the outer sleeve of the light source socket 40 in electrical contact therewith as one of the terminals of that light source 12. It may be recalled that the other terminal of that light source is the central terminal 42 which is, of course, electrically insulated from that clip 43, except for the load current path through that electric light source via the outer sleeve of its socket 40.

An embodiment of the invention effects application of the electric light source to any pair of the several pairs of batteries in the container 15 with the lid 38 by shifting position of the electric light source in that lid. In this respect, the drawings show an electric light source at 212 in FIG. 4. According to one alternative, that electric light source 212 is the same as the electric light source 12 in a different position, such as for one of the above mentioned applications of the light source to a second pair of batteries other than the first pair of batteries 13 and 14 shown in FIG. 2, for instance.

In this or any other manner within the scope of the invention, the electric light source may be switched around with the aid of the lid 38 among the various pairs of batteries as mentioned above.

Alternatively or additionally, the electric light source 12 may be switched to an OFF position by shifting position of that electric light source in the lid 38. In this respect, FIG. 6 shows a central terminal 42 and terminal clip 43 of a light source which is stored between four adjacent batteries in the container 15 in an OFF condition of that light source.

Figure 1:
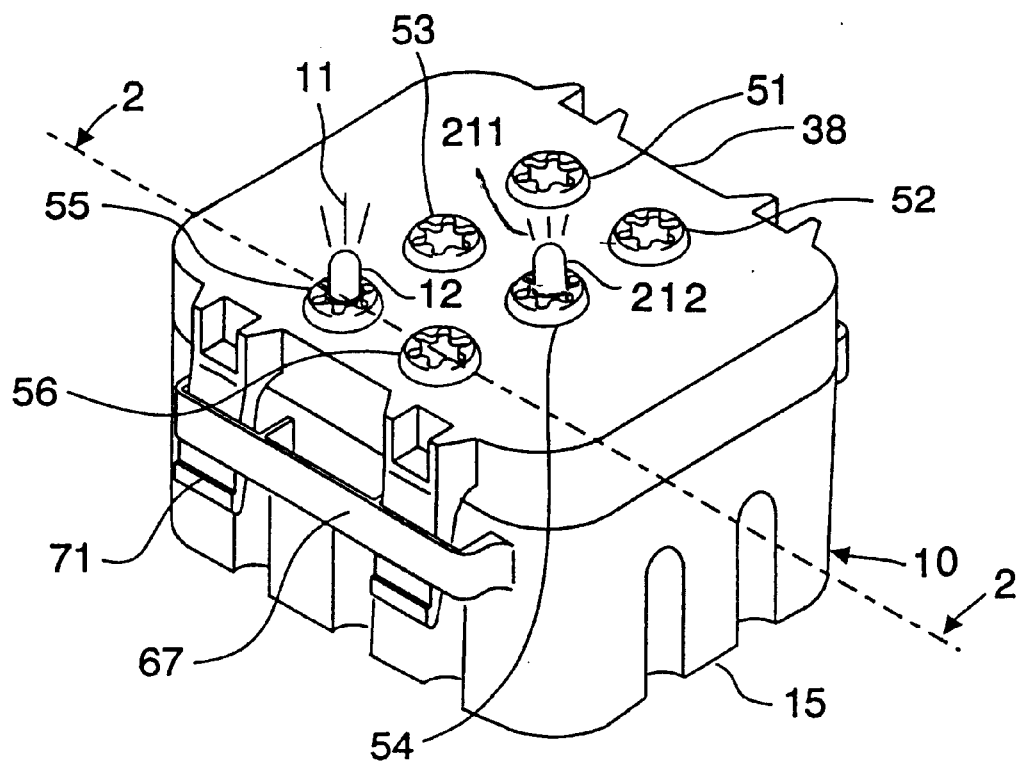
FIG. 1 is a perspective view from the top of a battery-containing apparatus for providing electric light according to an embodiment of the invention.
Figure 3:
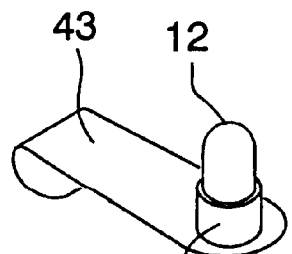
FIG. 3 is a perspective view on an enlarged scale of a lamp assembly used in the apparatus of FIGS. 1, 2, 4, 6, 7 and 8.

For reasons of economy, and as an indication of the versatility of illustrated embodiments of the invention, the showing of electric light source 12 and 212 in FIGS. 1 to 4 and 8 alternatively may be taken as an illustration of a second light source, in addition to the first-mentioned light source such as shown at 12 in FIGS. 1 and 2. In this respect and by way of example, the drawings may be taken as illustrating first and second light sources 12 and 212 which may be energized simultaneously from two different pairs of the batteries in the container 15, such as when a doubling of the light output from the apparatus 10 is desired, such as a doubling of the light output 11 shown in FIG. 2 for the electric light source 12 by adding the additional light output 211 such as apparent from FIG. 4, for instance.

Figures 6, 7, 8:
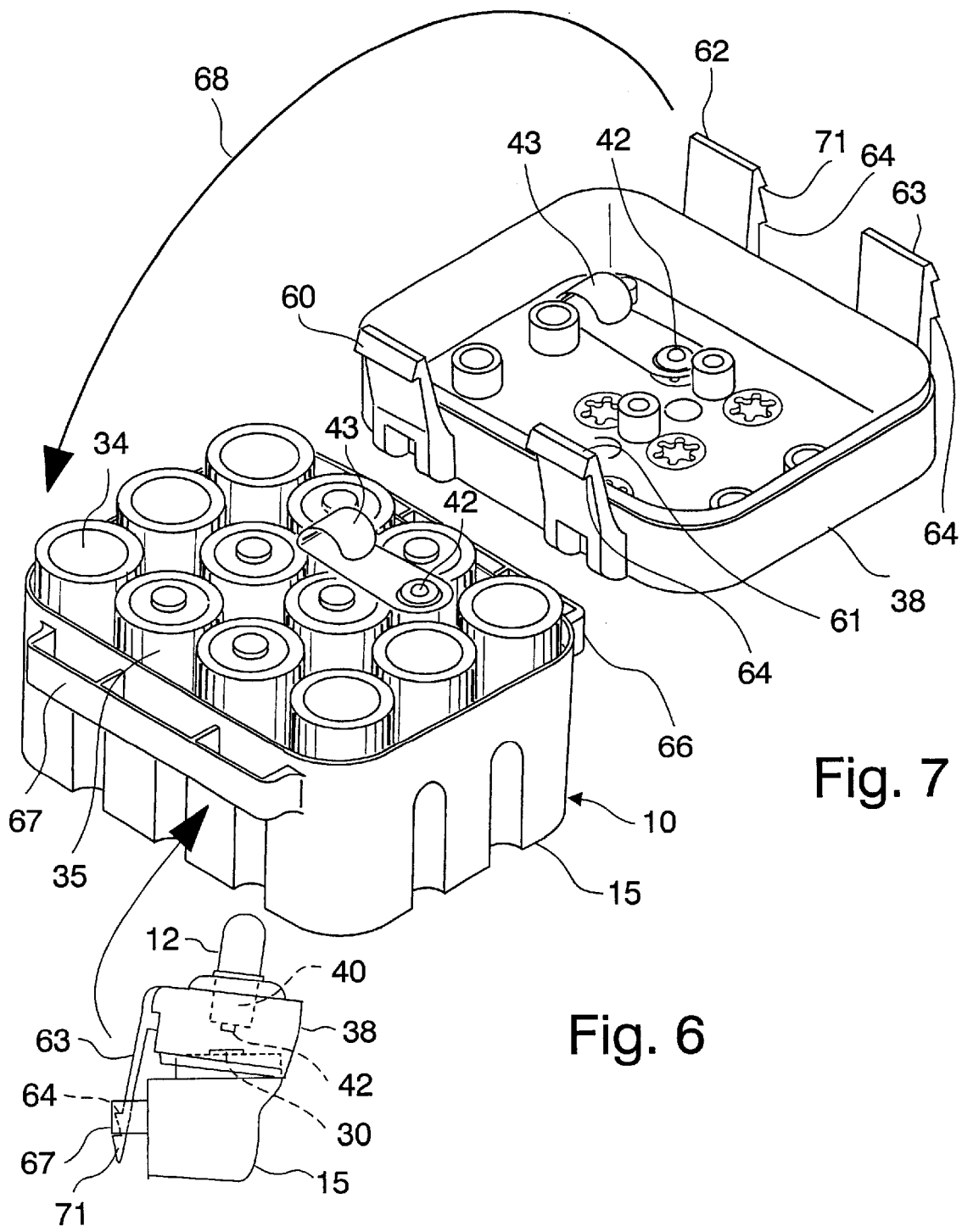
FIG. 6 is a view similar to FIG. 1 after removal of a container lid, showing a second lamp assembly in a storage position.
FIG. 7 is a perspective view of the inside of the container lid.
FIG. 8 is a detail view of an assembled container and container lid wherein the lid is partially open whereby a lamp is deenergized.

In this respect, FIGS. 6 and 7 show two electric light source terminals 42 with clips 43. One of these terminals with clip may be part of a first light source 12 and the other terminal and clip may be part of a second light source 212. In that case, the reference numeral 212 does not indicate a second position of the first light source 12, as in the example set forth above. Rather, such reference numeral now indicates a second electric light source 212 in this part of the disclosure and both light sources 12 and 212 may be used and energized simultaneously for the light outputs 11 and 211.

Against this background, a method according to an advanced embodiment of the invention provides electric light 11 and 211 by selecting first and second electric light sources 12 and 212 each requiring for energization a pair of batteries 13 and 14, etc., in series, making a portable container 15 for several pairs of such batteries, effecting a first energization of the first electric light source 12 from a first pair of such several pairs of batteries while located in that container, thereafter effecting a second energization of that first electric light source 12 from a second pair of such several pairs of batteries while located in that container, thereafter effecting a third energization of that first electric light source 12 from a third pair of such several pairs of batteries while located in that container, effecting an energization of the second electric light source 212 from a pair of such several pairs of batteries while located in that container, and thereafter effecting a further energization of that second electric light source 212 from another pair of such several pairs of batteries while located in that container 15.

The latter energization and further energization of the second electric light source 212 are successive, as are the first, second and third energizations of the first electric light source 12. Within the scope of the invention, any energization of the second light source 212 may be subsequent to an energization of the first light source 12, or may be simultaneous from a different pair of the batteries in the container 15.

An apparatus for providing electric light thus comprises an electric light source 12 requiring for energization a pair of batteries 13 and 14, etc., in series, a portable container 15 for several pairs of such batteries connected each in series at a bottom 46 of the container 15 and a socket 40 for the electric light source 12 including a pair of terminals, such as a central terminal 42 and another clip-shaped terminal 43 by extension of that socket 40. Such pair of electric light source terminals 42 and 43 corresponds to adjacent battery terminals, such as the above mentioned first positive terminal 30 of the first battery 13 and the second negative terminal 33 of the second battery 14 of the first pair of batteries. By extension, the expression "pair of electric light source terminals" also covers the electric light source terminals 42 and its clip-shaped terminal 43 which also correspond to adjacent battery terminals in another adjacent pair of batteries in the container 15, such as batteries 113 and 3, for instance.

By way of example, only two terminal clips 43 are shown in FIGS. 2, 3, 4, 6 and 7 for only two light sources 12 and 212. Within the scope of the invention, more terminal clips and more light sources may be provided in the apparatus 10, and the different light sources may have different strengths or luminous outputs 11, 211, etc.

In more general terms, a first energization of the electric light source 12 pursuant to an embodiment of the invention may include an application of the socket 40 with electric light source 12 to the first pair 13 and 14 of several pairs of batteries in the container 15, such as seen in FIG. 2. Similarly, a second energization of the electric light source 12 may include an application of the socket 40 with electric light source 12 to a second pair of the several pairs of batteries in the container 15, such as seen in FIG. 4, and a subsequent third energization of the electric light source 12 may include an application of the socket 40 with electric light source 12 to a third pair of the several pairs of batteries in the container 15, and so forth, preferably until there has been an application of that socket 40 with electric light source 12 to each and every pair of batteries in that container, such as through apertures 51 to 56 seriatim.

As illustrated and in a manner as described above, first positive terminals 30, etc., of first batteries 13, etc., of the several pairs of batteries, and second negative terminals 33, etc., of second batteries 14, etc., of those several pairs of batteries are positioned in substantially the same plane 36 for selective application of the corresponding terminals 42 and 43 of the socket 40 or light source 12 thereto for energization of that electric light source 12 therefrom.

Again, the lid 38 of the container 15 may be used for effecting application of the electric light source 12 via its socket 40 to any pair of the several pairs of batteries in that container.

According to an embodiment of the invention, the lid 38 of the container 15 may be provided with a first aperture 51 corresponding to the socket 40 at the first pair of the several pairs of batteries in the container 15, with a second aperture 52 corresponding to that socket at the second pair of the several pairs of batteries in that container, and with a third aperture, such as any one of 53 to 56, corresponding to that socket at the third pair of the several pairs of batteries in that container, and so forth, with a different socket-receiving aperture 40 at each different further pair of batteries, respectively.

The socket 40 may be inserted into a first aperture of the lid 38 and such lid may be closed for a first energization of the electric light source 12 by application of that socket with electric light source to a first pair of the several pairs of batteries in that container. Subsequently, that socket 40 may be removed from the first aperture and inserted into a second aperture of the lid and that lid 38 may be closed for a second energization of the electric light source 12 by application of that socket with electric light source to the second pair of the several pairs of batteries in the container, such as seen in FIG. 4. Similarly, that socket 40 may thereafter be removed from the second aperture and may thereupon be inserted into a third aperture of the lid 38 and such lid may be closed for a third energization of the electric light source 12 by application of the socket 40 with electric light source 12 to the third pair of the several pairs of batteries in the container, and so forth, moving the socket from one aperture to another aperture and thereupon from that aperture to yet another aperture, etc., and opening and closing the lid 38 during such progression for successive energization of the light source 12 from preferably all batteries in the container.

In structural terms, the lid 38 for or of the container 15 has a first aperture 51 corresponding to the socket 40 at a first pair of the several pairs of batteries in that container, and has a second aperture 52 corresponding to that socket at a second pair of the several pairs of batteries in that container, and has a third aperture 53 or 54, etc., corresponding to that socket at a third pair of the several pairs of batteries in that container, and so forth, such as with further socket-receiving apertures at fourth, fifth and sixth battery pairs, respectively.

Application of the socket 40 to the batteries in the container for energization of the light source 12 may be facilitated by provision of a hinge (not shown) between the lid 38 and that container 15. However, according to the illustrated embodiment of the invention, one of the container 15 and lid 38, such as the lid 38, may be provided with straps 60 to 63 each having a catch 64, and the other of such container 15 and lid 38, such as the container 15, may be provided with strap receptacles 66 and 67 releasably retaining each catch. In this or any other manner within the scope of the invention, the cover or lid 38 is releasably retained on the container 15.

FIGS. 6 and 7 jointly show an arrow 68 indicating how the lid 38 can be swung to its closed position on the battery container 15 for application of a light source 12 or 212 to adjacent batteries, thus as disclosed above and in FIGS. 1, 2 and 4. This in effect switches the light source ON.

Conversely, the light source may be switched OFF by removing the lid 38 from the container, such as shown in FIG. 7 relative to FIG. 6.

FIG. 8 illustrates an alternative solution according to an embodiment of the invention, whereby the lid is retained on the container, but in a partially open condition in which the light source is disconnected from the batteries, such as by a spacing of light source terminals 42 and 43 from terminals of adjacent batteries. A further catch 71 is provided on at least some of the straps to retain the lid in a partially open.

This switching feature according to the currently discussed embodiment of the invention has several advantages. First, it saves the traditional type of ON/OFF switch found in most flashlights and similar light sources and the circuitry for conducting electric currents to and from such traditional switch. Secondly, since the light source 12 as herein disclosed with reference to its above mentioned second showing 212 can cover as many energized active positions as there are pairs of batteries in the container, it is clear that the light source structure, such as with terminals 42 and 43 as herein disclosed, in effect amounts to a rather inexpensive electric multiposition switch, such as a seven-position switch (six ON and one OFF position) in the embodiment illustrated in FIGS. 1 to 8, without the expense and complexity of traditional multiposition switches of that capacity and capability.

An apparatus for providing electric light comprises an electric light source 12 requiring batteries for energization, a portable container 15 for several of such batteries, an electric light source mount and applicator including a lid 38 on that container selectively applying the electric light source to batteries when closed, such as seen in FIGS. 1, 2 and 4. Such apparatus has an electric light source OFF switching arrangement including a catch 71 between the lid and the container releasably retaining that lid in a partially open position so as to disconnect the electric light source from the batteries, such as indicated in FIG. 8 where the light source terminal 42 is spaced from an adjacent battery terminal 30.

As seen in FIG. 8, catch 71 or a pair of catches 71 may cooperate with a catch receptacle 67. A second catch or second catches 64 between the lid and the container releasably retains or retain the lid closed until released to its partially open position, such as seen in FIG. 8. The lid 38 thus may perform the function of an ON/OFF switch, such as between the ON position for light source energization shown in FIGS. 1, 2 and 4, and the alternative OFF position for light source deenergization, such as illustrated in FIG. 8.

Within the scope of the invention, provision of such a switching arrangement does not exclude provision of another ON/OFF switch, if desired.

Electric contacts 73, such as in an electric conductor structure 74, may be provided at a bottom 46 of the battery container 15 between terminals 31 and 32 of adjacent batteries 13 and 14, etc., of any pair of the several pairs of batteries in that container 15, such as shown by way of example in FIGS. 2 and 4.

Within the scope of the invention, such electric contacts or conductor structure may extend between terminals 31 and 32, etc., of all batteries in the container 15, such as between all first negative terminals 31, etc., and all second positive terminals 32, etc., of all batteries at a bottom of the container.

In this or any other manner within the scope of the invention, adjacent batteries 13 and 14, etc., of each of the pairs of batteries are electrically connected in series at a bottom of container 15 through a negative terminal 31, etc., of one of such adjacent batteries and through a positive terminal 32, etc., of the other of such adjacent batteries of each pair.

The subject invention and its embodiments for instance are useful for emergency lighting, nocturnal low-level illumination, lighting during camping trips, and in a large number of other applications, particularly where a steady light over relatively long periods of time is desired or useful.

The container 15 is typically filled with long-life batteries, such as alkaline batteries or preferably lithium batteries and their equivalents. In this respect, a particular advantage of the invention and its preferred embodiments is that a multitude of batteries for long-time energization of a light source 12 are readily present in the container that mounts such light source. On the average, some fifty hours of emergency lighting are thus possible with one fill of lithium batteries in the container 15. In disasters, this can provide a week of emergency lighting for many hours each night, until electric power can be restored.

This in contrast to conventional flashlights whose battery compartment contains only the batteries that jointly are used at the same time for energizing the flashlight. In those prior-art cases, backup batteries had to be carried separately from the flashlight for replacement of the flashlight's batteries in the flashlight's battery compartment, often with an ensuing confusion between used and fresh batteries.

The system and apparatus of the subject invention avoid such drawbacks and provides a battery-operated electric light source wherein spare batteries are readily contained and wherein mixups between exhausted and fresh batteries are effectively avoided.

Within the scope of the invention, the light source 12, preferably with socket 40, may be duplicated, such as at 212, or triplicated, such as mentioned above, for a doubling or tripling of the light output through simultaneous application of several light sources 12, 212 to several pairs of the battery pairs in the container.

However, according to a preferred further embodiment of the invention, a flashlight 100 having a light output 311 stronger than the electric light source 12 is provided, when a light output stronger than what the source 12 can provide as light output 11 is desired.

Such flashlight 100 is separate from the container 15 and preferably is provided for use of batteries 13, 14, etc., from that container. In this manner, batteries may be exchanged between the container 15 and the flashlight 100, such as indicated in FIG. 9 by use of the same reference numerals 13 and 14 for the batteries 13 and 14 as shown in the container of FIG. 2, for instance.

By way of example, batteries 13, 14, etc., from compartments in the container 15 may be inserted into the flashlight 100 for a light output 311 stronger than what the electric light source 12 can provide, or even stronger what the light sources 12 and 212 can provide in the apparatus 10. Conversely, batteries having been used in the flashlight 100 may be inserted from that flashlight into the container 15 of the apparatus 10 for energization of the electric light source 12 and/or 212 instead of the light source 152 of the flashlight 100 for a continuation of a light output 11 and/or 211 with used batteries.

Figure 9:
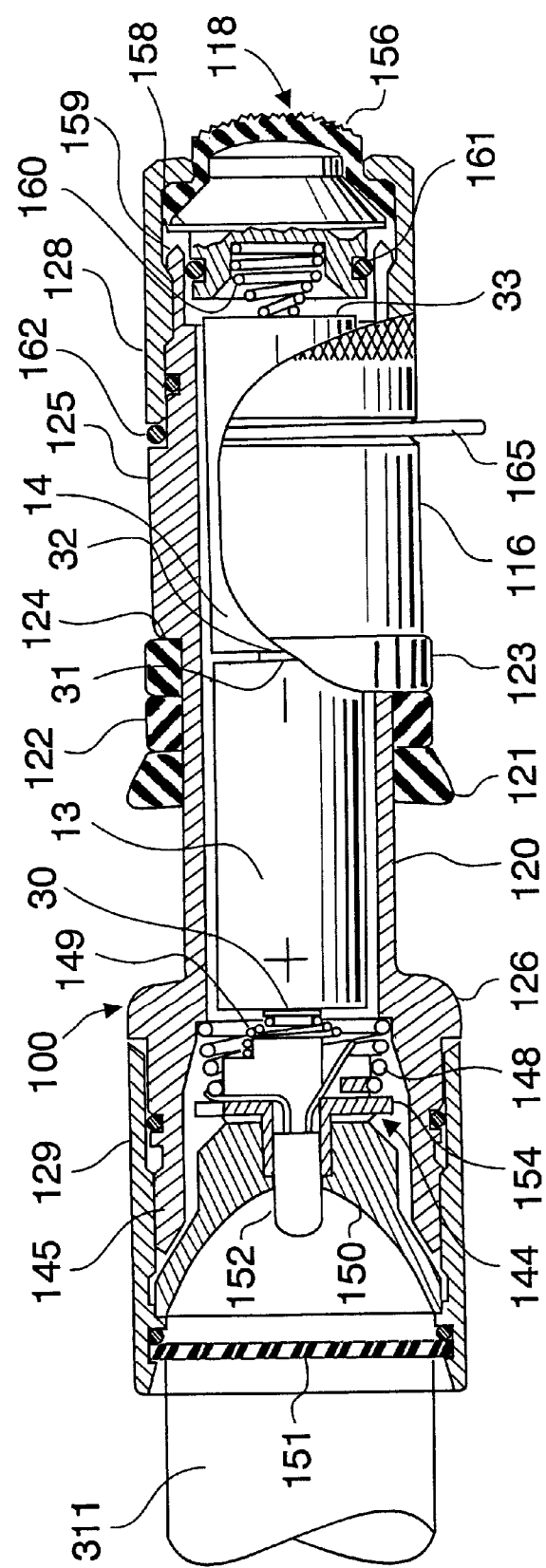
FIG. 9 is a longitudinal section through a flashlight combined with the apparatus of FIGS. 1 to 8 and to be viewed in conjunction with those figures according to a preferred embodiment of the invention.

This combination of apparatus 10 with flashlight 100 thus provides a synergistic combination according to an embodiment of the invention, which in combination provides more than what either the apparatus 10 or the flashlight 100 can provide by itself Those skilled in the art may recognize the flashlight shown in FIG. 9 as the flashlight of applicant's U.S. Pat. No. 5,642,932 issued Jul. 1, 1997 for Combat-Oriented Flashlight, and hereby incorporated by reference herein. Other flashlights may be used in combination with the apparatus 10 within the scope of the invention, but the illustrated flashlight 100 represents a fine example of an advanced flashlight for the type of person most likely to use the apparatus 10 and similar apparatus within the scope of the invention.

The invention provides the flashlight 100 with a battery barrel 116 and provides such battery barrel with a tail-end switch 118 for that flashlight. The illustrated preferred embodiment of the invention provides the battery barrel with a reduced diameter portion 120 spaced from the tail-end switch 118 and provides such battery barrel with a retention element 121 projecting from that reduced diameter portion 120 for engagement by at least one of the fingers of the human hand during switching of the flashlight with the tail-end switch 118 at the thumb area of the user's hand.

The flashlight 100 may be made adaptable to various human hand sizes by rendering the retention element 121 adjustable in position on the reduced diameter portion 120 relative to the tail-end switch 118. By way of example, the retention element 121 may be shifted away from the tail end switch 118 for users with large hands. Conversely, the retention element may be shifted closer to that tail end switch for users with small hands. According to the illustrated embodiment, the retention element is adjustable in position on the reduced diameter portion 120 in discrete steps relative to the tail-end switch 118, such as indicated at 121, 122, 123 more fully described below.

The battery barrel 116 is provided with a shoulder 124 between the reduced diameter portion 120 and the tail-end switch 118. That shoulder may, for instance, be the beginning, at the reduced diameter portion 120, of an increased diameter portion 125 of the barrel between that reduced diameter portion and the tail end switch. That shoulder 124 itself may qualify as the retention element and in a simple embodiment may indeed, perform the function of the retention element 121.

The retention element 121 preferably is retained or is adapted for retention at or at least with the shoulder 124. The retention element 121 preferably extends around the reduced diameter portion 120 and is axially retained in place, or is adapted for axial retention, by the shoulder 124.

According to the illustrated embodiment of the invention, the flashlight is rendered adaptable to typical human hand sizes by providing the reduced diameter portion 120 with removable spacer elements 122 and 123 between the retention element 121 and the shoulder 124 of the battery barrel. The retention element 121 and the spacer elements 122 and 123 may be of rubber or of another elastomeric material, so that they can be worked over the thickened portion 125 of the barrel 116. On the other hand, solid spacers may be used if the barrel is for instance made in two pieces so that the reduced and enlarged diameter portions 120 and 125 or 126 can be temporarily separated from each other and then reassembled, or if such enlarged diameter portions are in effect provided by a lengthened tail end cap 128 or lamp housing 129.

In the illustrated embodiments, the retention element 121 is projected beyond a maximum lateral dimension of the barrel 116, such as beyond the maximum diameter of the barrel at its thickened portion 125. For one thing, this improves the grip of the human hand on the improved flashlight 100.

According to a preferred embodiment, the reduced diameter portion 120 is dimensioned for retention, or is otherwise adapted to be held, between two adjacent fingers of a human hand and the retention element 121 is adapted to be engaged by these two fingers during switching of the flashlight at the thumb area via tail end switch 118.

Handling of the flashlight 100 may be improved by means of a lanyard (not shown) attached to the barrel 116 between its reduced diameter portion 120 and the tail-end switch 118.

The flashlight 100 according to this aspect of the invention uses batteries derived from or eventually destined for the apparatus 10, such as the above mentioned batteries 13 and 14 having spaced first and second battery terminals 30 and 33, such as shown in FIGS. 2 and 4. The expression "battery" may refer to a single cell and to an assembly of two or more cells having a common terminal 30, in addition to the opposite terminal 33, for instance. Accordingly, in one embodiment of the invention, the flashlight shown by way of illustration at 100 may in fact be a flashlight that uses only one of the batteries 13 or 14, etc., rather than both batteries at the same time. Conversely, the flashlight shown by way of illustration at 100 may be a flashlight that uses three or more of the batteries from or for the apparatus 10, for instance.

Broadly speaking within the scope of the invention, a method of providing electric light with an electric light source, such as the light source 12, comprising, in combination, making a portable container 15 for at least half a dozen batteries, effecting a first energization of that electric light source 12 from one of these batteries while located in that container, thereafter effecting a second energization of the electric light source 12 from a second one of these batteries while located in that container, and thereafter effecting a third energization of the electric light source from a third one of these batteries while located in that container, providing a flashlight 100 having a light output 311 stronger than the above mentioned electric light source 12 and being separate from the container 15 for use of batteries from that container, and exchanging batteries between that container 15 and that flashlight 100. As mentioned above, the expression "battery" may refer to a single cell and to an assembly of two or more cells. Provision and use of batteries in pairs of batteries is presently preferred in the apparatus 10, but not necessarily in the corresponding flashlight 100.

The illustrated flashlight 100 comprises a lamp assembly 144 having the lamp housing or bezel 129 threaded on an end portion or projection 145 of the battery barrel 116. Within the scope of the invention, the lamp assembly 144 may be mounted on the battery barrel by means other than threading.

The lamp assembly 144 has spaced first and second lamp terminals 148 and 149 adapted to contact the battery barrel 116 and the battery terminal 30, respectively. These terminals may be springs at 148 and 149 that may act like shock-absorbers, guarding the lamp against shock loads and against impact from shifting batteries.

The lamp assembly 144 may include a lamp reflector 150 releasably retained by the threaded bezel 129. A plastic disc or other transparent lens or member 151 protects the flashlight bulb 152 and reflector 150.

The bulb 152 may include an incandescent filament (not shown) connected between lamp terminals or springs 148 and 149 for energization through battery terminals 31 and 33 when the tail-end switch 118 is depressed.

The springs 148 and 149 may be held in a piece of ceramic or other electrically insulating material or retainer 154 which may also mount the lamp or bulb 152.

The illustrated embodiment includes a flexible diaphragm 156 across an end of the threaded tail cap 128. Within the scope of the invention, such diaphragm may be depressible against or toward the battery 14 or batteries 13 and 14 in the barrel 116 for some kind of switching of the lamp 152 upon depression and relaxation of the flexible diaphragm 156.

The switching function of the flashlight is not limited to any particular kind of electrical or mechanical switching mechanism. However, in the illustrated embodiment, the tail-end switch 118 includes a plunger 158 capable of contacting an end portion 159 of the barrel 116. A spring 160 at the battery terminal 33 biases the plunger 158 away from the barrel end 159. No electric current can then flow from the battery to the lamp 152, inasmuch as the plunger 158 is also electrically insulated from the barrel 116 by an elastic O-ring 161, and inasmuch as the tail end cap 128 either is of electrically insulating material or is electrically insulated from the battery barrel 116, such as by anodizing the threads between the tail end cap 128 and barrel 116 at 159.

However, upon depression of the plunger 158 against the bias of battery terminal spring 160, such as by inward depression of the diaphragm 156, if present, the plunger 158 contacts the barrel end 159, thereby closing an electrical circuit from the rear battery terminal 33, battery terminal spring 160, electrically conducting plunger 158, rear barrel end 159, electrically conducting barrel or other electrical conductor through barrel 116, first lamp assembly terminal spring 148, lamp 152, second lamp assembly terminal spring 149, front battery terminal 30, whereby the lamp 152 is lit by electric energy from the battery or series connected battery elements 13 and 14, for instance, in the barrel 116.

Pursuant to a preferred embodiment, the diaphragm switching feature is combined with a rotary or translatory switching feature. For instance, the tail cap 128 may be rotated or otherwise moved relative to the barrel 116 until the lamp 152 is at the point of being lit, except for the existence of a small gap between the plunger 158 and barrel end contact 159. The lamp or flashlight may then be lit by a relatively small depression of the flexible diaphragm 156 or other actuation of the plunger 158, such as by a finger, thumb or thumb area of the user's hand.

In practice, the travel of the diaphragm 156 or plunger 158 required for actuation of the flashlight, or the "touch" of the flashlight so to speak, is then easily adjusted for different persons and preferences by preliminary rotary or other motion of the tail cap 128 relative to the barrel 116.

For added convenience, or independently of these features, a lanyard (not shown) may be attached to the flashlight barrel between the enlarged diameter portion 125 and the tail cap 128, such as by means of a rotatable ring structure 162 that may have a radially extending loop 165 for attachment of that lanyard.

The flashlight 100 is very handy and is immune to the kind of wear, tear and defect that affects prior-art flashlights equipped with conventional "on-off" sliding switches, even though those may be used in the practice of the subject invention as well.

The flashlight 100 can be clenched in a person's fist, with the person's fingers extending around part of the circumference of the barrel 116 and the person's thumb being then in a position to activate the flashlight by depression of the end switch 118, such as by inward depression of the diaphragm 156 or plunger 158.

In this manner, the user can forcefully hold and activate the flashlight 100 which as mentioned above preferably has a powerful beam or light output 311.

For instance, the user can hold the flashlight with clenched fingers at a side of his or her head and can then activate the flashlight with his or her thumb so that it shines into the dark ahead of his or her head without blinding his or her eyes. A user thus can shine the flashlight forcefully and effectively into an attacker's eyes, stunning him and prompting him to go elsewhere.

By way of further example, a user can walk with the flashlight 100 clenched in his or her fingers and with the light beam pointing downwardly to illuminate his or her path. The user can easily activate and deactivate the light beam with his or her thumb while walking. Moreover, a driver or passenger in an automobile or other vehicle can use the flashlight in the position just mentioned to find locations on a road map or along the road, or to illuminate road signs or house numbers.

Moreover, a person can hold the flashlight backward, such in the web between thumb and index finger or between index and middle finger and can then actuate the flashlight with, say, the middle finger or the thumb at the tail-end switch 118. In this manner, the user can shine the light behind his or her person, so as to discourage people that follow him or her too closely. After adapting the flashlight to the hand of the user at 121 to 123 and after adjusting the flashlight to the preferred touch of the user at 128, that user may place the reduced or "necked down" portion 120 of the flashlight at barrel 116 between the index finger and middle finger of one hand, preferably right down against the bottom of the web between these two fingers. The user then may position the tail end of the flashlight against the ball of his or her thumb or thumb area. The user may initially test the flashlight and adjust it at 121 to 123 and 128, until it has the right feel and touch and will serve well in life threatening situations and confrontations, where the light comes on easily, but not inadvertently.

In this manner the user can work out the right grip, where the flashlight is comfortable and the switching is easily controllable, so that the user neither will be left in the dark when he or she needs light, nor will become a lit target when darkness is preferable in a given situation.

In practice,. the user can clench the flashlight in one hand and can use such hand to support the hand that holds a weapon (not shown). With practice, the flashlight 100 becomes a very effective tactical adjunct of his or her weapon.

Figure 10:
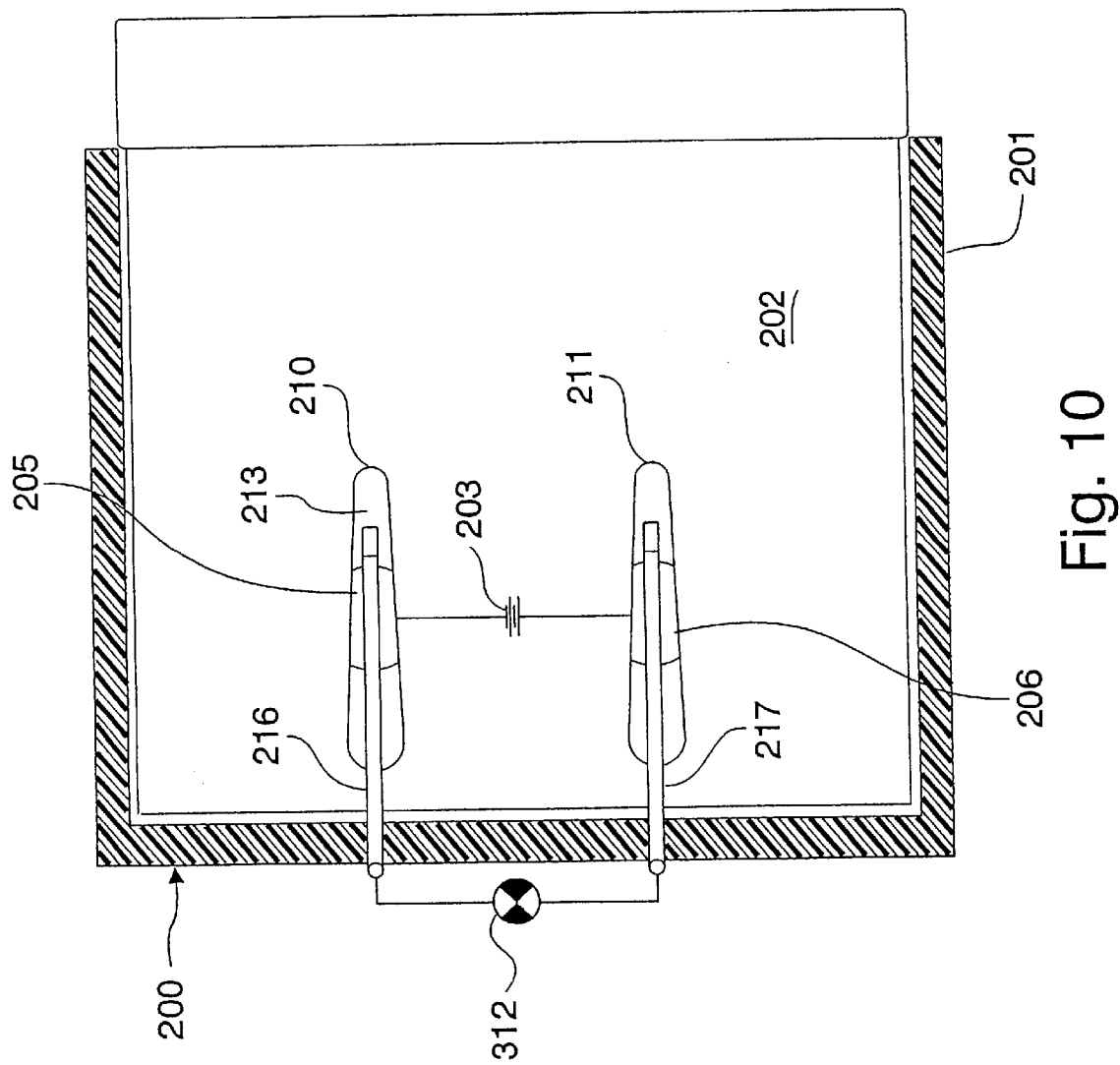
FIG. 10 is a partially sectioned top view of a flashlight using an unspent battery of a photographic film pack.
Figure 11:
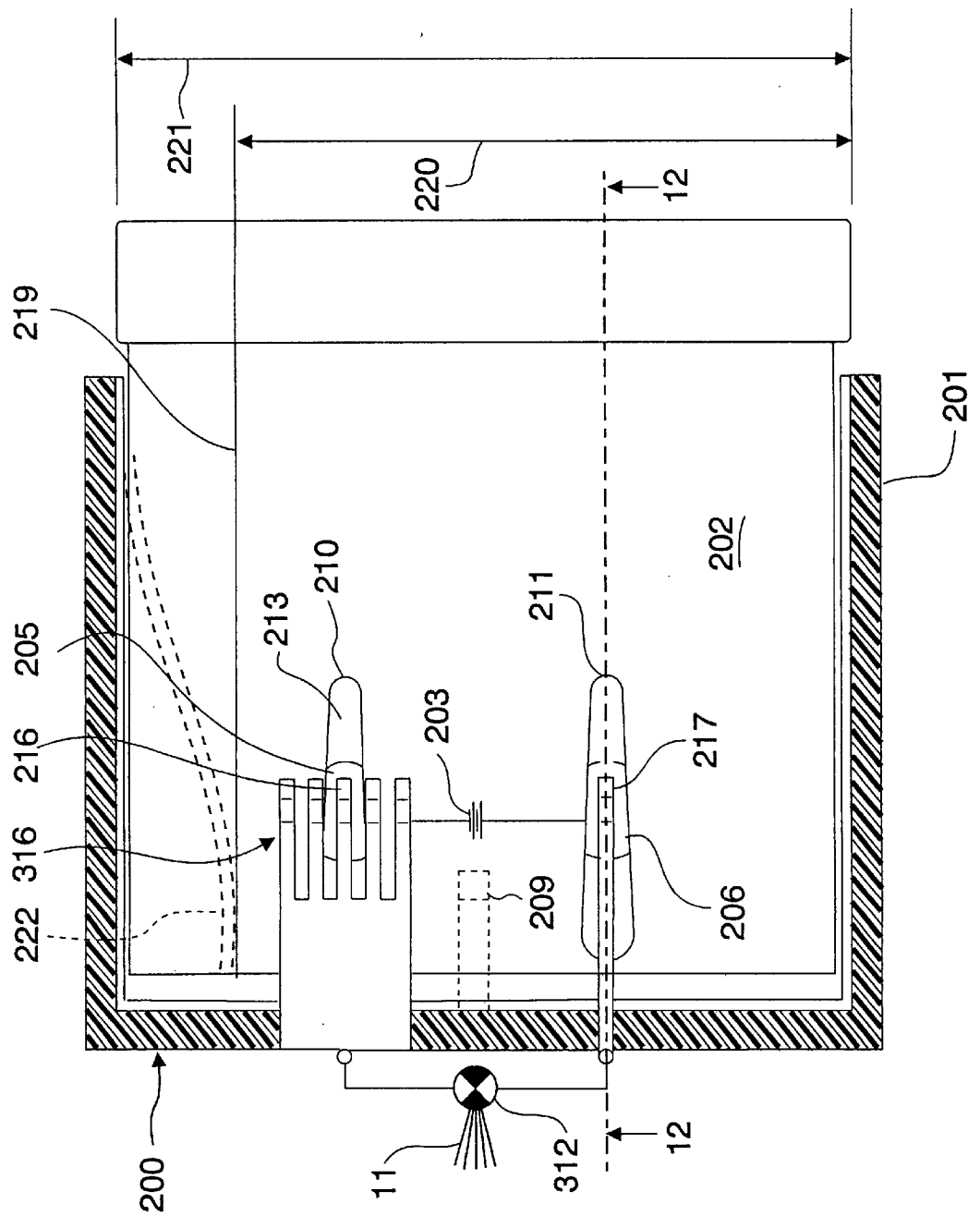
FIG. 11 is a view similar to FIG. 10, but showing the flashlight in an energized condition.
Figure 12:
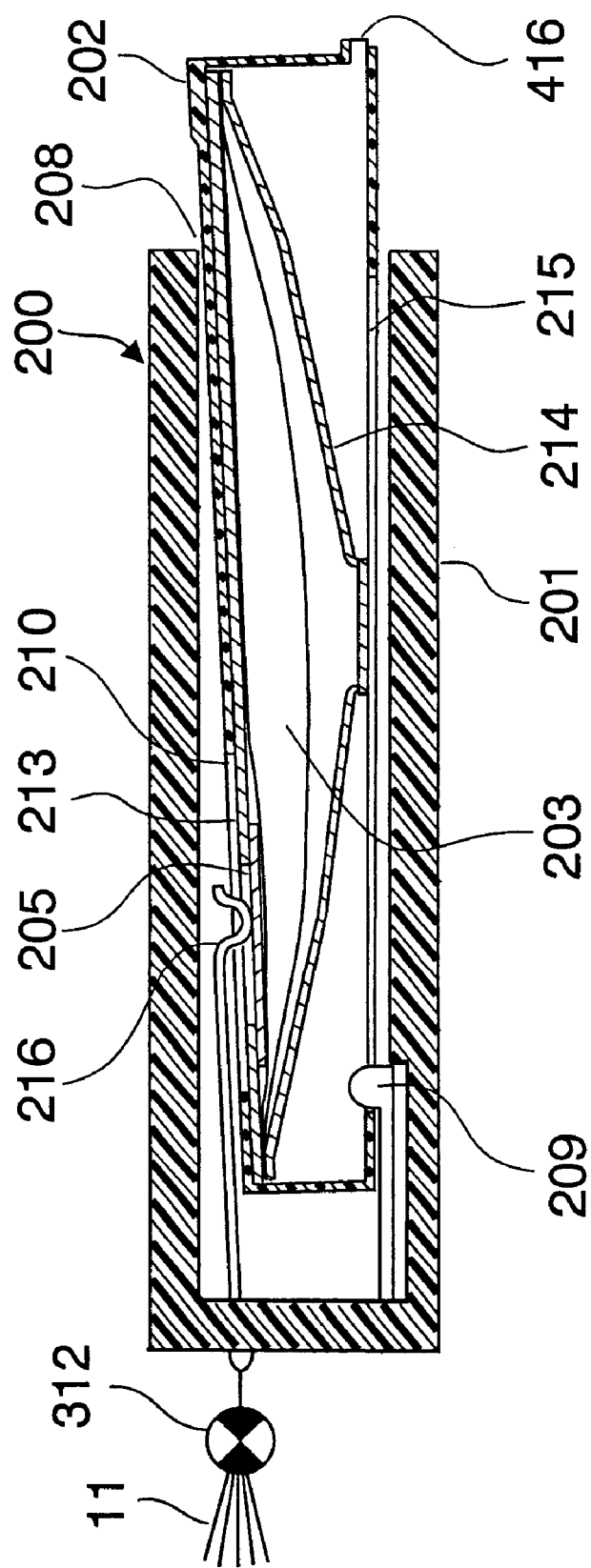
FIG. 12 is a section taken on the line 12—12 in FIG. 11.

A further embodiment of the invention shown in FIGS. 10 to 12 uses batteries provided in photographic film packs for lighting purposes.

As mentioned above, photographic film packs are well known which include their own internal battery, such as for energization of a film advance motor, a photoflash, an exposure meter system, focusing apparatus and/or a camera-to-object indicating device. Typically, the battery still has power when all photographic film has been used up from the film pack.

The currently disclosed aspect of the invention uses such unspent batteries that have a pair of output terminals 205 and 206 in a photographic film pack 200 and provides apparatus 200 for that purpose. This aspect of the invention provides a container 201 for receiving a photographic film pack 202 and provides at that container an electric light source 312 for energization by the unspent battery in the typically otherwise exhausted film pack.

Such photographic film pack 202 is inserted into the container 201 and is alternated in that container between a first or rest position in which the battery is disconnected from the electric light source, such as shown in FIG. 10, and a second position, such as shown in FIGS. 11 and 12 wherein the electric light source 312 is connected to the pair of output terminals 205 and 206 in that second position of the photographic film pack in the container.

The container 201 preferably is shaped in the manner of a box. According to the illustrated embodiment of the invention, the first position in which the battery is disconnected from the electric light source is obtained by inserting the photographic film pack 202 into the container as far as it will go, such as seen in FIG. 10.

The film pack preferably is releasably retained in that first position. Latches or detents may be provided for that purpose, but a slight press fit will do in most situations. In this respect FIG. 12 which illustrates the second position of the film pack shows a gap 208 between an inside of the container 201 and the partially inserted film pack 202. That gap may be closed when the film pack, such as shown in FIG. 10, is pushed in all the way whereby the film pack releasably binds in the container until pulled out manually from the first position shown in FIG. 10 to the second position shown in FIGS. 11 and 12.

In this respect, the second position in which the electric light source is connected to the pair of battery output terminals 205 and 206 preferably is obtained by partially withdrawing the photographic film pack 202 from the container 201, such as seen in FIGS. 11 and 12. The film pack may be releasably retained in that second position, such as by means of a catch 209 engaging the photographic film pack.

Practice of the subject invention is not limited to any particular kind or type of film pack, as long as it has an internal battery. Professionals and amateurs alike may recognize the film pack 220 as being of a kind made and sold by Polaroid Corporation. That kind of pack has two elongate openings 210 and 211 in its shell. A piece of thin electrically insulating material, such as cardboard is inside of the shell between the pouch-like battery 203 and that shell of the film pack. The battery electrodes 205 and 206 appear in openings of that electrically insulating piece 213. A system of resilient film supports 214 inside the shell pushes the pieces of photographic film inside the film pack towards an opening 215 of the shell through which one piece of film after another is exposed when the film pack is in a photographic camera, typically of an instant type for what is known as "instant photography." After each exposure, the battery 203 energizes an electric motor that advances the exposed piece of film through a slot 216 in the film pack. This by way of background, since the film pack 210 typically is only inserted into the container 201 after all film has been driven from the film pack.

The apparatus 200 has a pair of electric current pickups 216 and 217 to which the electric light source is connected for energization from the battery 203. In the first or rest position of the film pack, the current pickups 216 and 217 are on the electrically insulating sheet 213 whereby the light source is disconnected from the battery. However, upon movement of the film pack 202 to its second or active position shown in FIGS. 11 and 12, the pickups 216 and 217 come to ride on the battery terminals 205 and 206 for energization of the light source from the battery 203 and emission of light 11. The light source is thus switched ON.

Conversely, the light source is switched OFF by pushing the film pack 202 fully into the container 201, whereby the current pickups 216 and 217 come to ride on the electrically insulating piece of material 213.

According to an embodiment of the invention, different film packs with unspent batteries are alternatively accommodated in the container 201 for energization of the light source. By way of example, FIG. 10 may be taken as showing a Polaroid® type spectra platinum instant film pack. While this is also the case with respect to FIGS. 11 and 12, a line 219 in FIG. 11 indicates the possibility of use of a narrower film pack, such as the Polaroid® type 600 platinum instant film pack. Having a width 220 narrower than the width 221 of the type spectra platinum instant film pack. A leaf spring 222 is an example of means for accommodating different sizes of film packs, such as shown in FIG. 11.

FIG. 11 also shows a refinement for connecting the electric light source to any one of alternatively accommodated different film packs with unspent batteries in the container 201. Such refinement may include a plurality or set of finger-like pickups at each battery terminal 205 and 206. In order to avoid overcrowding of the drawing, only one set 316 is shown in FIG. 11, but a pair of such sets may be provided at the previously mentioned pickups 216 and 217 or battery terminals 205 and 206. In this manner, battery packs of smaller width 220 and the like may shift laterally in the container and still contact with their battery electrodes 205 and 206 one of the pickups at 216 and 217 for energization of the electric light source 312 in the second position of that smaller battery pack.

In this or any other manner within the scope of the invention, the utility of photographic film packs having internal batteries is extended beyond the supply of film from the pack. Moreover, the batteries in the film packs will be spent by the draw of current for energization of the light source 312 so that all electrolyte is substantially neutralized in each internal film pack battery, before the spent film pack is thrown away or otherwise disposed of. This considerably benefits the environment, inasmuch as the number of film packs disposed continuously is huge over large areas of the United States and other regions of the world.

This extensive disclosure will render apparent or suggest to those skilled in the art various modifications and variations within the spirit and scope of the invention.

We claim:

1. A method of providing electric light, comprising in combination:
    selecting an electric light source requiring for energization a pair of batteries in series;
    making a portable container for several pairs of said batteries;
    making a lid for said container;
    effecting a first energization of said electric light source from a first pair of said several pairs of said batteries while located in said container with said lid;
    thereafter effecting a second energization of said electric light source from a second pair of said several pairs of said batteries while located in said container with said lid; and
    thereafter effecting a third energization of said electric light source from a third pair of said several pairs of said batteries while located in said container with said lid.

2. A method as in claim 1, wherein:
    each of said several pairs of said batteries includes a first battery having a first positive terminal and an opposite first negative terminal, and a second battery having a second positive terminal connected to said first negative terminal and an opposite second negative terminal; and
    first positive terminals of first batteries of said several pairs of said batteries and second negative terminals of second batteries of said several pairs of said batteries are positioned in substantially the same plane for selective application of said electric light source thereto for energization therefrom.

3. A method as in claim 1, wherein:
    said first energization of said electric light source includes an application of said electric light source to said first pair of said several pairs of said batteries in said container;
    said second energization of said electric light source includes an application of said electric light source to said second pair of said several pairs of said batteries in said container; and
    said third energization of said electric light source includes an application of said electric light source to said third pair of said several pairs of said batteries in said container.

4. A method as in claim 3,
including:
   effecting application of said electric light source to any pair of said several pairs of said batteries in said container with said lid.
5. A method as in claim 1,
including:
   making a socket for said electric light source including electric terminals for application to any pair of said several pairs of said batteries for energization of said light source.
6. A method as in claim 5,
including:
   providing said lid for said container with a first aperture corresponding to said socket at said first pair of said several pairs of said batteries in said container, with a second aperture corresponding to said socket at said second pair of said several pairs of said batteries in said container, and with a third aperture corresponding to said socket at said third pair of said several pairs of said batteries in said container;
   inserting said socket into said first aperture of said lid and closing said lid for said first energization of said electric light source by application of said socket with electric light source to said first pair of said several pairs of said batteries in said container;
   subsequently removing said socket from said first aperture and inserting said socket into said second aperture of said lid and closing said lid for said second energization of said electric light source by application of said socket with electric light source to said second pair of said several pairs of said batteries in said container; and
   thereafter removing said socket from said second aperture and inserting said socket into said third aperture of said lid and closing said lid for said third energization of said electric light source by application of said socket with electric light source to said third pair of said several pairs of said batteries in said container.
7. A method as in claim 5,
wherein:
   said first energization of said electric light source includes an application of said socket with electric light source to said first pair of said several pairs of said batteries in said container;
   said second energization of said electric light source includes an application of said socket with electric light source to said second pair of said several pairs of said batteries in said container; and
   said third energization of said electric light source includes an application of said socket with electric light source to said third pair of said several pairs of said batteries in said container.
8. A method as in claim 7,
including:
   effecting application of said electric light source via said socket to any pair of said several pairs of said batteries in said container with said lid.
9. A method as in claim 1,
including:
   effecting application of said electric light source to any pair of said several pairs of said batteries in said container with said lid by shifting position of said electric light source in said lid.
10. A method as in claim 1,
including:
   effecting application of said electric light source to any pair of said several pairs of said batteries in said container with said lid and alternatively switching said electric light source to an OFF position by shifting position of said electric light source in said lid.
11. A method as in claim 1,
wherein:
   adjacent batteries of each of said pairs of said batteries are electrically connected in series at a bottom of said container through a negative terminal of one of said adjacent batteries and through a positive terminal of the other of said adjacent batteries of each pair.
12. A method as in claim 1,
wherein:
   said container is shaped in the manner of a box.
13. A method of providing electric light,
comprising in combination:
   selecting an electric light source requiring for energization a pair of batteries in series;
   making a portable container for several pairs of said batteries;
   effecting a first energization of said electric light source from a first pair of said several pairs of said batteries while located in said container;
   thereafter effecting a second energization of said electric light source from a second pair of said several pairs of said batteries while located in said container;
   thereafter effecting a third energization of said electric light source from a third pair of said several pairs of said batteries while located in said container;
   providing a flashlight having a light output stronger than said electric light source and being separate from said container for use of batteries from said container; and
   exchanging batteries between said container and said flashlight.
14. A method as in claim 13,
wherein:
   batteries from said container are inserted into said flashlight for said light output stronger than said electric light source.
15. A method as in claim 13,
wherein:
   batteries having been used in said flashlight are inserted from said flashlight into said container for energization of said electric light source instead of said flashlight for a continuation of a light output.
16. A method of providing electric light,
comprising in combination:
   selecting first and second electric light sources each requiring for energization a pair of batteries in series;
   making a portable container for several pairs of said batteries;
   effecting a first energization of said first electric light source from a first pair of said several pairs of said batteries while located in said container;
   thereafter effecting a second energization of said first electric light source from a second pair of said several pairs of said batteries while located in said container;
   thereafter effecting a third energization of said first electric light source from a third pair of said several pairs of said batteries while located in said container;
   effecting an energization of said second electric light source from a pair of said several pairs of said batteries while located in said container; and thereafter effecting a further energization of said second electric light source from another pair of said several pairs of said batteries while located in said container.

17. A method as in claim 16,
wherein:
each of said several pairs of said batteries includes a first battery having a first positive terminal and an opposite first negative terminal, and a second battery having a second positive terminal connected to said first negative terminal and an opposite second negative terminal; and
first positive terminals of first batteries of said several pairs of said batteries and second negative terminals of second batteries of said several pairs of said batteries are positioned in substantially the same plane for selective application of said electric light source thereto for energization therefrom.

18. A method as in claim 16,
wherein:
adjacent batteries of each of said pairs of said batteries are electrically connected in series at a bottom of said container through a negative terminal of one of said adjacent batteries and through a positive terminal of the other of said adjacent batteries of each pair.

19. A method of providing electric light with an electric light source,
comprising in combination:
making a portable container for at least half a dozen batteries;
effecting a first energization of said electric light source from one of said batteries while located in said container;
thereafter effecting a second energization of said electric light source from a second one of said batteries while located in said container; and
thereafter effecting a third energization of said electric light source from a third one of said batteries while located in said container;
providing a flashlight having a light output stronger than said electric light source and being separate from said container for use of batteries from said container; and
exchanging batteries between said container and said flashlight.

20. Apparatus for providing electric light,
comprising in combination:
an electric light source requiring for energization a pair of batteries in series;
a portable container for several pairs of said batteries; and
means including an electrical conductor structure at a bottom of said container between terminals of all batteries in said container for alternatively effecting a first energization of said electric light source from a first pair of said several pairs of said batteries while located in said container, a second energization of said electric light source from a second pair of said several pairs of said batteries while located in said container, and a third energization of said electric light source from a third pair of said several pairs of said batteries while located in said container.

21. Apparatus as in claim 20,
wherein:
each of said several pairs of said batteries includes a first battery having a first positive terminal and an opposite first negative terminal, and a second battery having a second positive terminal connected to said first negative terminal and an opposite second negative terminal; and
first positive terminals of first batteries of said several pairs of said batteries and second negative terminals of second batteries of said several pairs of said batteries are in substantially the same plane for selective application of said electric light source thereto for energization therefrom.

22. Apparatus as in claim 20,
wherein:
said means include electric contacts at a bottom of said container between terminals of adjacent batteries of any pair of said several pairs of said batteries in said container.

23. Apparatus as in claim 20,
wherein:
said means include means for alternatively applying said electric light source to said first pair of said several pairs of said batteries in said container, to said second pair of said several pairs of said batteries in said container, and to said third pair of said several pairs of said batteries in said container.

24. Apparatus as in claim 23,
wherein:
said means for alternatively applying said electric light source include a lid for said container.

25. Apparatus for providing electric light,
comprising in combination:
an electric light source requiring for energization a pair of batteries in series;
a portable container for several pairs of said batteries connected each in series at a bottom of said container;
each of said several pairs of said batteries including a first battery having a first positive terminal and an opposite first negative terminal, and a second battery having a second positive terminal connected to said first negative terminal and an opposite second negative terminal, with first positive terminals of first batteries of said several pairs of said batteries and second negative terminals of second batteries of said several pairs of said batteries being in substantially the same plane for selective application of said electric light source thereto for energization therefrom;
a socket for said electric light source including terminals corresponding to adjacent terminals of any one of said several pairs of batteries in said container; and
an electric conductor structure at a bottom of said container between terminals of all batteries in said container.

26. Apparatus for providing electric light,
comprising in combination:
an electric light source requiring for energization a pair of batteries in series;
a portable container for several pairs of said batteries connected each in series at a bottom of said container;
each of said several pairs of said batteries including a first battery having a first positive terminal and an opposite first negative terminal, and a second battery having a second positive terminal connected to said first negative terminal and an opposite second negative terminal, with first positive terminals of first batteries of said several pairs of said batteries and second negative terminals of second batteries of said several pairs of said batteries being in substantially the same plane for selective application of said electric light source thereto for energization therefrom;

a socket for said electric light source including terminals corresponding to adjacent terminals of any one of said several pairs of batteries in said container; and a lid for said container having a first aperture corresponding to said socket at a first pair of said several pairs of said batteries in said container, having a second aperture corresponding to said socket at a second pair of said several pairs of said batteries in said container, and having a third aperture corresponding to said socket at a third pair of said several pairs of said batteries in said container.

27. Apparatus as in claim 26,
including:
an OFF position location for said light source inside said lid.

28. Apparatus as in claim 26,
including:
a catch between said lid and said container.

29. Apparatus for providing electric light,
comprising in combination:
an electric light source requiring for energization a pair of batteries in series;

a portable container for several pairs of said batteries connected each in series at a bottom of said container;

each of said several pairs of batteries including a first battery having a first positive terminal and an opposite first negative terminal, and a second battery having a second positive terminal connected to said first negative terminal and an opposite second negative terminal, with first positive terminals of first batteries of said several pairs of said batteries and second negative terminals of second batteries of said several pairs of said batteries being in substantially the same plane for selective application of said electric light source thereto for energization therefrom;

a socket for said electric light source including terminals corresponding to adjacent terminals of any one of said several pairs of batteries in said container;

an electric light source mount and applicator including a lid on said container selectively applying said electric light source to said batteries when closed; and an electric light source OFF switching arrangement including a catch between said lid and said container releasably retaining said lid in a partially open position so as to disconnect said electric light source from said batteries.

30. Apparatus as in claim 29,
including:
a second catch between said lid and said container releasably retaining said lid closed until released to said partially open position.

31. Apparatus for providing electric light,
comprising in combination:
an electric light source requiring batteries for energization;

a portable container for several of said batteries;

an electric light source mount and applicator including a lid on said container selectively applying said electric light source to said batteries when closed; and an electric light source OFF switching arrangement including a catch between said lid and said container releasably retaining said lid in a partially open position so as to disconnect said electric light source from said batteries.

32. Apparatus as in claim 31,
including:
a second catch between said lid and said container releasably retaining said lid closed until released to said partially open position.

33. A method of using an unspent battery having a pair of output terminals in a photographic film pack,
comprising in combination:
providing a container for receiving said photographic film pack; providing at said container an electric light source for energization by said unspent battery;

inserting said photographic film pack into said container;

alternating said photographic film pack in said container between a first position in which said battery is disconnected from said electric light source and a second position; and connecting said electric light source to said pair of output terminals in said second position of said photographic film pack in said container.

34. A method as in claim 33,
wherein:
said first position in which said battery is disconnected from said electric light source is obtained by inserting said photographic film pack into said container as far as it will go.

35. A method as in claim 33,
wherein:
said film pack is releasably retained in said first position.

36. A method as in claim 33,
wherein:
said second position in which said electric light source is connected to said pair of output terminals is obtained by partially withdrawing said photographic film pack from said container.

37. A method as in claim 33,
wherein:
said film pack is releasably retained in said second position.

38. A method as in claim 33,
wherein:
said film pack is releasably retained in said second position with a catch engaging said photographic film pack.

39. A method as in claim 33,
wherein:
different film packs with unspent batteries are alternatively accommodated in said container for energization of said light source.

40. A method as in claim 33,
wherein:
different film packs with unspent batteries are alternatively accommodated in said container; and
said electric light source is connected to any one of said alternatively accommodated different film packs with unspent batteries in said container.

41. A method of providing electric light, comprising in combination:
- selecting an electric light source requiring for energization a pair of batteries in series;
- making a portable container for several pairs of said batteries;
- making a lid for said container; and
- effecting energization of said light source including effecting application of said electric light source to any pair of said several pairs of said batteries in said container with said lid.

42. A method as in claim 41, wherein:
- application of said electric light source to any pair of said several pairs of said batteries in said container with said lid is effected by shifting position of said electric light source in said lid.

43. A method as in claim 41, including:
- alternatively switching said electric light source to an OFF position by shifting position of said electric light source in said lid.

44. A method as in claim 41, wherein:
- a flashlight having a light output stronger than said electric light source and being separate from said container is provided for use of batteries from said container; and
- batteries are exchanged between said container and said flashlight.

* * * * *